United States Patent
Yamauchi et al.

(10) Patent No.: US 7,121,744 B2
(45) Date of Patent: Oct. 17, 2006

(54) OPTICAL LINK DEVICE

(75) Inventors: Kiyoshi Yamauchi, Kanagawa (JP); Takeshi Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 107 days.

(21) Appl. No.: 10/483,250

(22) PCT Filed: May 13, 2003

(86) PCT No.: PCT/JP03/05938

§ 371 (c)(1), (2), (4) Date: Jan. 9, 2004

(87) PCT Pub. No.: WO03/096096

PCT Pub. Date: Nov. 20, 2003

(65) Prior Publication Data

US 2004/0175080 A1    Sep. 9, 2004

(30) Foreign Application Priority Data

May 14, 2002   (JP)   ............................. 2002-138612

(51) Int. Cl.
  G02B 6/36   (2006.01)
  G02B 6/42   (2006.01)
  G02B 6/32   (2006.01)

(52) U.S. Cl. ............................. 385/93; 385/31; 385/33; 385/88; 385/89

(58) Field of Classification Search ................. 385/93, 385/14, 31, 33, 49, 88, 89, 92
See application file for complete search history.

(56) References Cited

U.S. PATENT DOCUMENTS 4,572,611 A * 2/1986 Bellman et al. ............ 399/218
5,093,879 A * 3/1992 Bregman et al. ............. 385/93
5,648,874 A * 7/1997 Sawaki et al. .............. 359/622
5,848,211 A * 12/1998 Yang et al. .................. 385/93

(Continued)

FOREIGN PATENT DOCUMENTS

JP         58049903        3/1983

(Continued)

OTHER PUBLICATIONS

International Search Report dated Jul. 1, 2003.

(Continued)

*Primary Examiner*—Brian Healy
*Assistant Examiner*—Charlie Peng
(74) *Attorney, Agent, or Firm*—Rader, Fishman & Grauer PLLC; Ronald P. Kananen (57) ABSTRACT

An optical link device is provided that is capable of avoiding deterioration of a signal by preventing stray light from coming into a light receiving element and is capable of miniaturizing the device itself. There are provided a light emitting element which outputs an optical signal toward one optical fiber, a light receiving element which receives an optical signal inputted from another optical fiber, an element mounting unit on which the light emitting element and the light receiving element are mounted, a lens body having a transmission side lens unit for guiding the optical signal outputted from the light emitting element to the one optical fiber, and a reception side lens unit for guiding the optical signal outputted from the other optical fiber to the light receiving element. The transmission side lens unit and the reception side lens unit are integrally formed, and a light shield is formed integrally with the lens body between the transmission side lens unit and the reception side lens unit thereof, which is made of a material different from the transmission side lens unit and the reception side lens unit.

8 Claims, 7 Drawing Sheets

U.S. PATENT DOCUMENTS

| | | | | |
|---|---|---|---|---|
| 5,973,844 | A * | 10/1999 | Burger | 359/622 |
| 6,289,155 | B1 * | 9/2001 | Wade | 385/37 |
| 6,707,613 | B1 * | 3/2004 | Fujimoto et al. | 359/622 |
| 6,717,734 | B1 * | 4/2004 | Fujimoto | 359/619 |
| 6,718,091 | B1 * | 4/2004 | Ishihara et al. | 385/36 |
| 6,893,941 | B1 * | 5/2005 | Suda | 438/455 |
| 2002/0063348 | A1 * | 5/2002 | Imamura et al. | 264/1.1 |

FOREIGN PATENT DOCUMENTS

| | | |
|---|---|---|
| JP | 59-056779 A | 4/1984 |
| JP | 61226701 | 10/1986 |
| JP | 01-229201 | 9/1989 |
| JP | 1-229201 A | 9/1989 |
| JP | 10-126002 A | 5/1998 |
| JP | 10126002 | 5/1998 |
| JP | 11-187392 | 7/1999 |
| JP | 11-187392 A | 7/1999 |
| JP | 2000-66064 A | 3/2000 |
| JP | 2001-174675 A | 6/2001 |
| JP | 2001-242348 A | 9/2001 |

OTHER PUBLICATIONS

Supplementary European Search Report, Dated Dec. 30, 2005.
European Patent Search Report, Dated May 4, 2006.

* cited by examiner

PRIOR ART

Fig.8

PRIOR ART

OPTICAL LINK DEVICE

TECHNICAL FIELD

The present invention relates to an optical link device. In detail, the present invention relates to the technical field of an optical link device to which a pair of optical fibers through which an optical signal is transmitted are connected and which transmits and receives data.

BACKGROUND ART

There is an optical link device to which a pair of optical fibers through which an optical signal is transmitted are connected and which transmits and receives data through the optical fibers.

Hereinbelow, an example of a conventional optical link device will be conceptually shown (see FIG. 7).

An optical link device a has an element mounting unit b and a lens body c disposed inside a not-shown housing.

The element mounting unit b has a light emitting element d and a light receiving element e respectively mounted thereon.

The lens body c comprises a transmission side lens unit f and a reception side lens unit g formed integrally.

A pair of optical fibers h, h are respectively connected to the housing of the optical link device a.

In a condition that the pair of optical fibers h, h are connected to the optical link device, when an electrical signal is inputted from an external device, for example, a personal computer, the electrical signal is photoelectrically converted in the light emitting element d and outputted from the light emitting element d to one of the optical fibers h as an optical signal (laser beam).

The optical signal outputted from the light emitting element d is inputted to the transmission side lens unit f of the lens body c, converged by the transmission side lens unit f and inputted to the other of the optical fibers h so that data transmission and reception is carried out.

On the other hand, when an optical signal is transmitted through the other of the optical fibers h, the transmitted optical signal is outputted from the optical fiber h toward the light receiving element e.

The optical signal outputted from the other optical fiber h is inputted to the reception side lens unit g of the lens body c and photoelectrically converted so that an electrical signal is generated. The electrical signal is inputted to the external device so that data transmission and reception is carried out.

Figure 7:
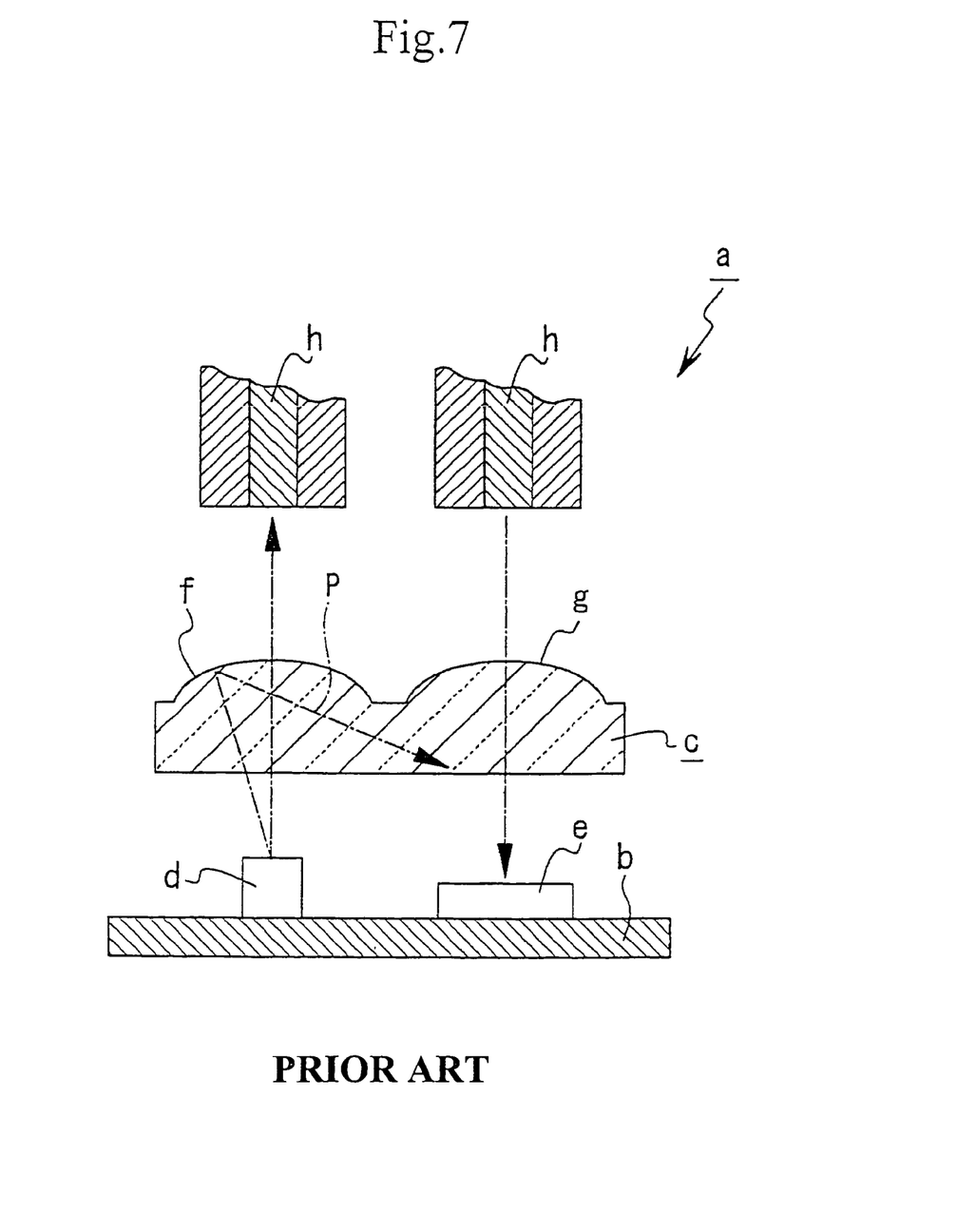
FIG. 7 is a conceptual view showing a conventional optical link device.

However, in the conventional optical link device a, when the optical signal outputted from the light emitting element d is inputted to the lens body c, the optical signal may be possibly inputted from the transmission side lens unit f to the light receiving element e as a stray light owing to reflection and double refraction generated in the lens body c, as shown with an arrow P in FIG. 7, which may result in deterioration of the optical signal inputted from the optical fiber h to the light receiving element e.

In addition, the optical signal outputted from the light emitting element d toward the optical fiber h through the transmission side lens unit f may also reflect on a tip surface of the optical fiber h so that a stray light comes into the light receiving element e transmitting through the reception side lens unit g.

Figure 8:
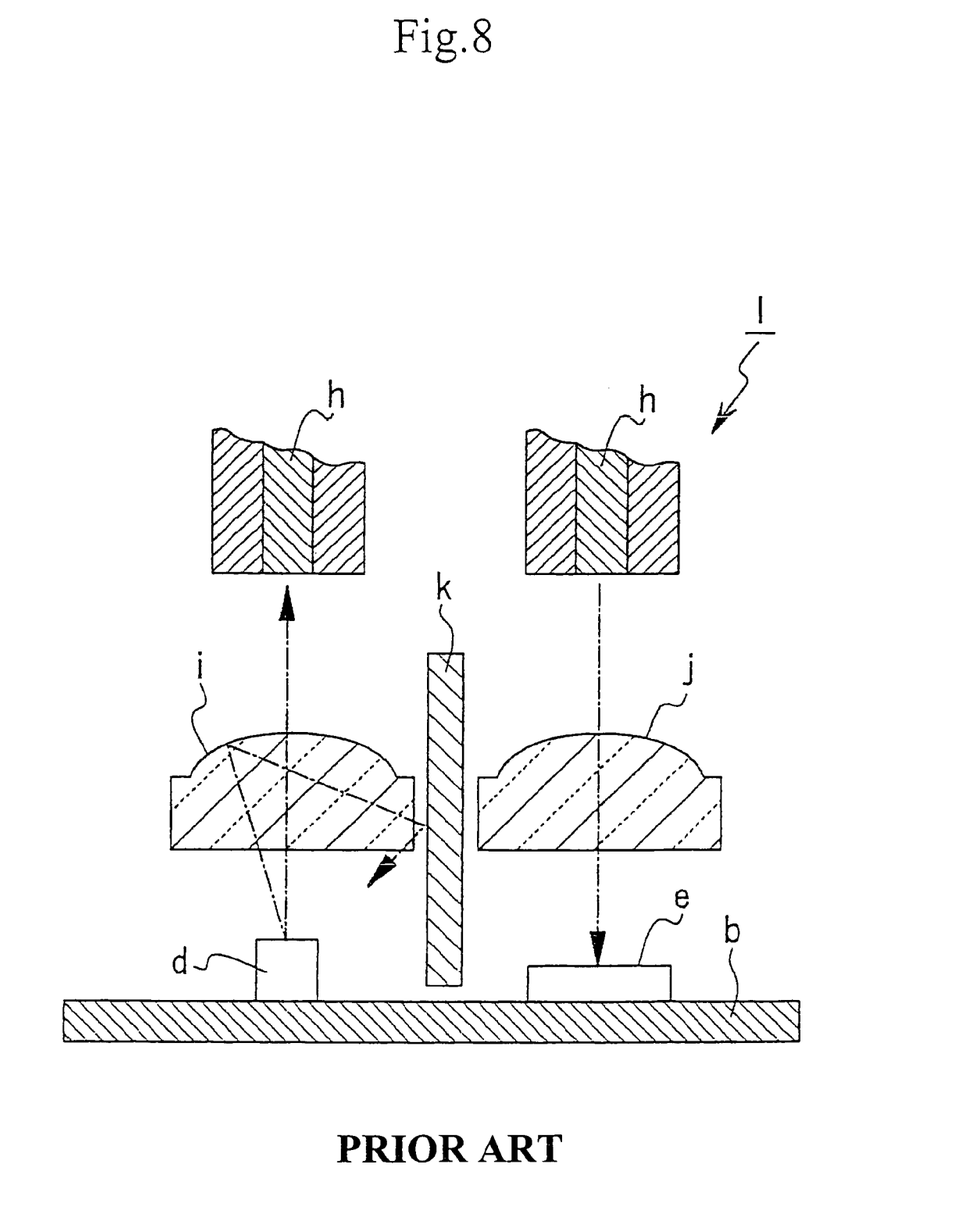
FIG. 8 is a conceptual view showing another conventional optical link device.

Therefore, in order to solve such problems, there is an optical link device 1 having a light shielding plate k provided between a transmission side lens i and a reception side lens j, which are separately formed (see FIG. 8).

In such an optical link device 1, the optical signal outputted from the light emitting element d to be a stray light is shielded by the light shielding plate k, and the stray light is prevented from coming into the light emitting element e.

However, in the optical link device 1, since a certain space for positioning the light shielding plate k is needed between the transmission side lens i and the reception side lens j, an interval between the lenses is required to be wide, which results in another problem that the optical link device becomes large.

Furthermore, because the transmission side lens i, the reception side lens j and the light shielding plate k are separately formed, there will be another problem that the number of parts required is increased and manufacturing cost will rise.

In view of this, the optical link device of the present invention has an object to avoid deterioration of a signal due to a stray light coming into a light receiving element and to have a device smaller in size.

DISCLOSURE OF INVENTION

In order to solve the above-described problem, an optical link device of the present invention is provided with a light emitting element to which an electrical signal is inputted and which converts the electrical signal into an optical signal so as to output it to one of the optical fibers; a light receiving element to which an optical signal is inputted from the other of the optical fibers and which converts the optical signal into an electrical signal so as to output it; an element mounting unit on which the light emitting element and the light receiving element are mounted; and a lens body having a transmission side lens unit for guiding the optical signal outputted from the light emitting element to the one optical fiber and a reception side lens unit for guiding the optical signal outputted from the other optical fiber to the light receiving element, in which the transmission side lens unit and the reception side lens unit are integrally formed, and, in the device, a light shielding unit that is made of a material different from the transmission side lens unit and the reception side lens unit and formed integrally with the lens body between the transmission side lens unit and the reception side lens unit thereof is provided.

Therefore, in the optical link device of the present invention, input of the optical signal from the transmission side lens unit to the reception side lens unit is shielded.

In order to solve the above described problem, another optical link device of the present invention is provided with a light emitting element to which an electrical signal is inputted and which converts the electrical signal into an optical signal so as to output it to one of optical fibers; a light receiving element to which an optical signal is inputted from the other of the optical fibers and which converts the optical signal into an electrical signal so as to output it; an element mounting unit on which the light emitting element and the light receiving element are mounted; and a lens body having a transmission side lens unit for guiding the optical signal outputted from the light emitting element to the one optical fiber and a reception side lens unit for guiding the optical signal outputted from the other optical fiber to the light receiving element, in which the transmission side lens unit and the reception side lens unit are integrally formed, and, in the device, a light shielding cover having a pair of transmission holes through which the optical signal outputted from the light emitting element or the optical signal to be inputted to the light receiving element is transmitted, which is disposed between the lens body and the light emitting element and light receiving element.

Therefore, in the optical link device of the present invention, the lens body and the light emitting element and the light receiving element are separated by the light shielding cover.

BRIEF DESCRIPTION OF DRAWINGS

FIG. 1, together with FIG. 2 and FIG. 3, show a first embodiment of the present invention.

FIG. 4, together with FIG. 5 and FIG. 6, show a second embodiment of the present invention.

BEST MODE FOR CARRYING OUT THE INVENTION

In the following, an embodiment of an optical link device of the present invention will be explained in line with the attached drawings.

Figure 2:
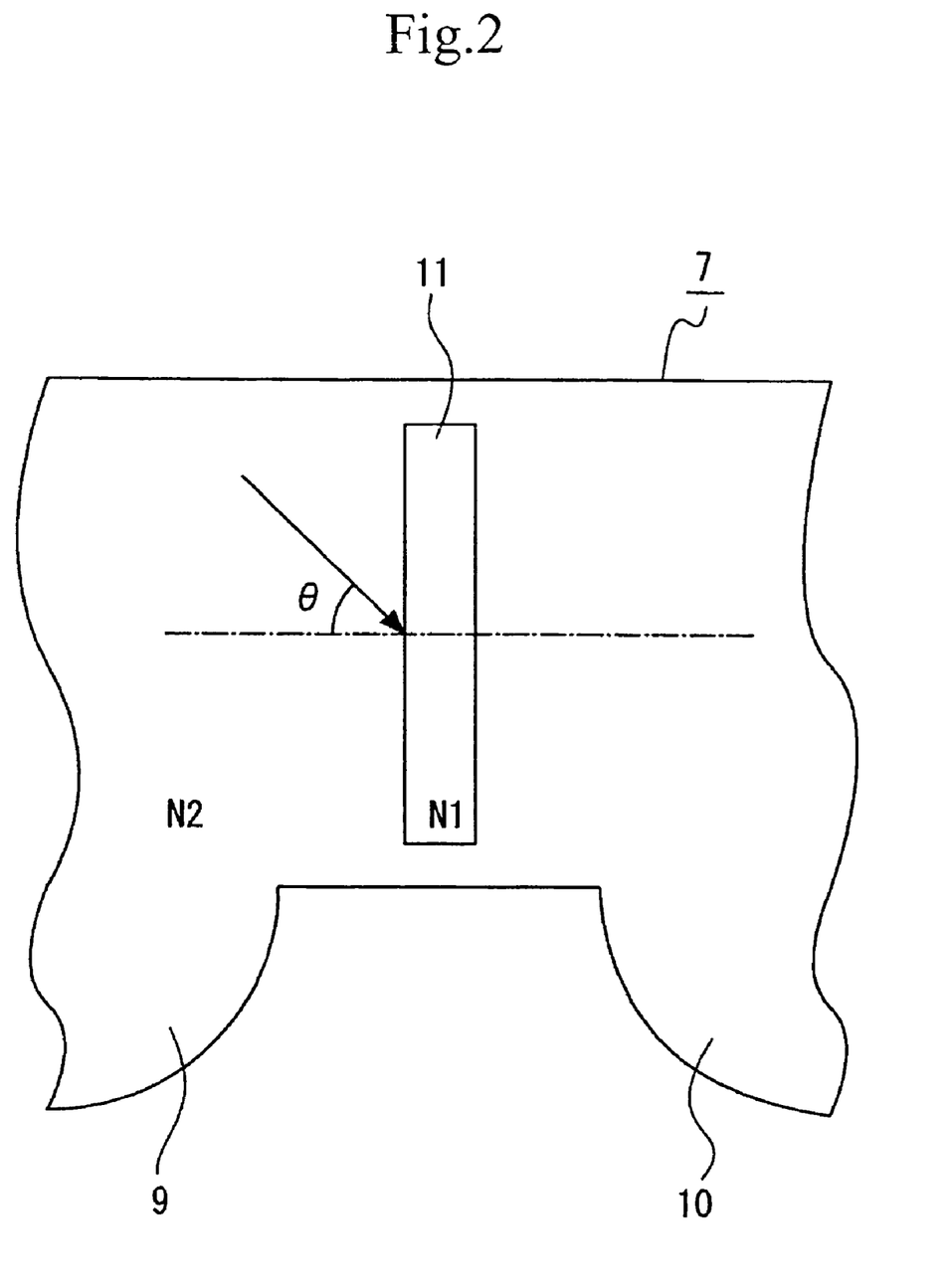
FIG. 2 is a conceptual view for explaining a condition of total reflection.
Figure 3:
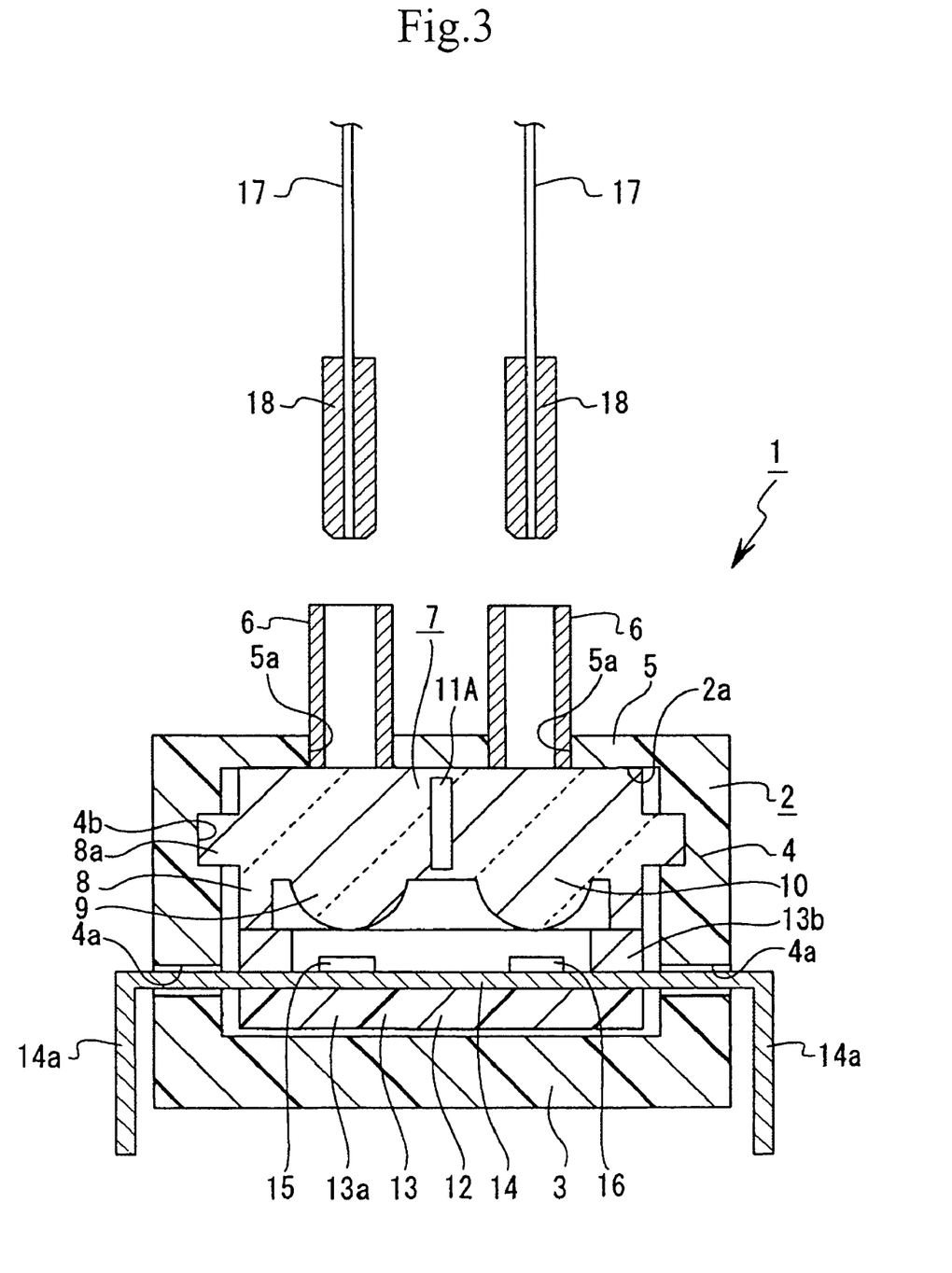
FIG. 3 is an enlarged sectional view of an optical link device showing an example using an air gap as a light shielding unit.

First, a first embodiment will be explained (see FIG. 1 to FIG. 3).

Figure 1:
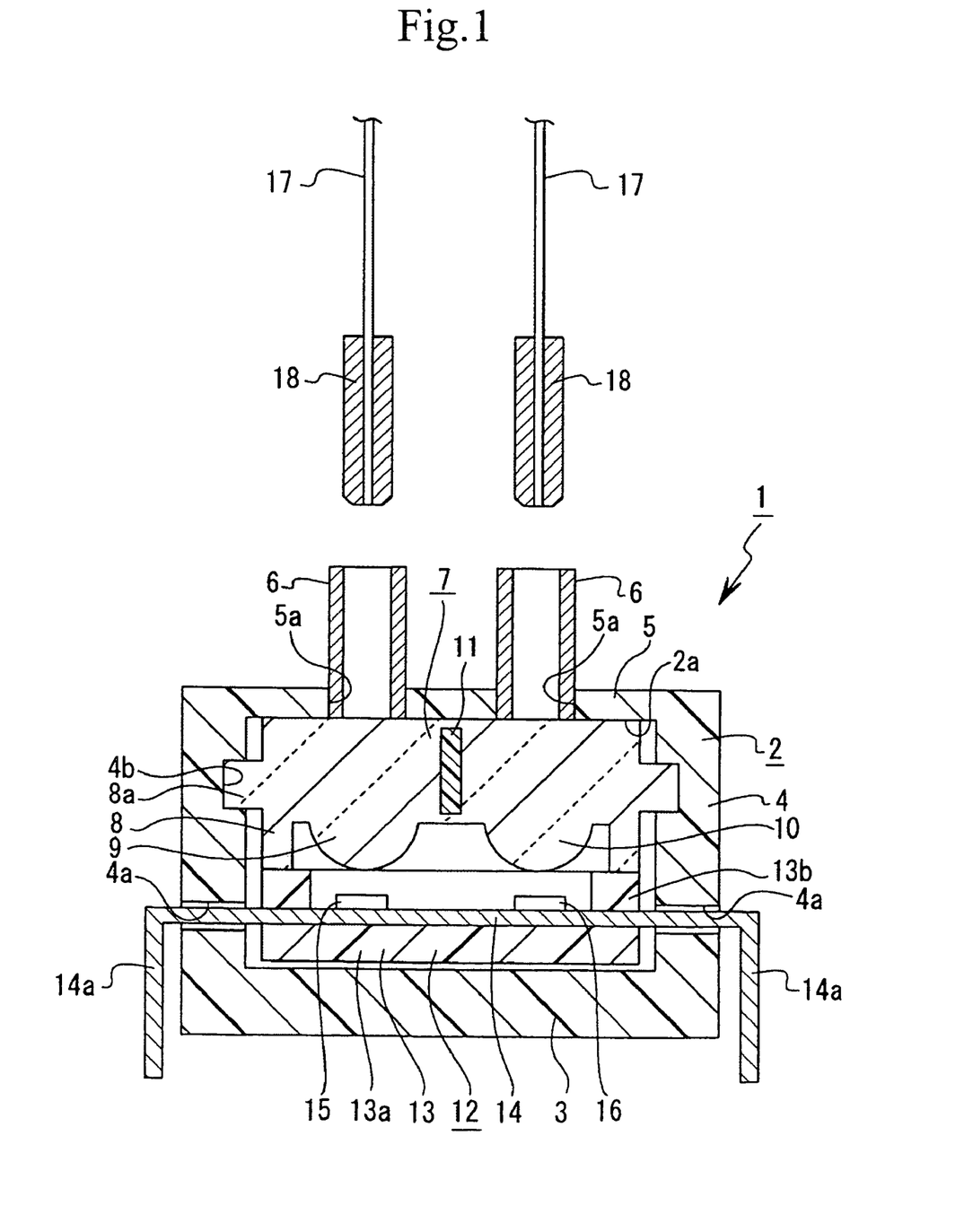
FIG. 1 shows an enlarged cross-sectional view of an optical link device and an optical fiber.

An optical link device 1 comprises a box-shaped housing 2, and the housing 2 is made of a resin material (see FIG. 1). The housing 2 comprises a bottom plane portion 3, a side plane portion 4 that stands at an outer periphery of the bottom plane portion 3, and a top plane portion 5 positioned to face the bottom plane portion 3, and inside thereof is formed as a positioning space 2a. The housing 2 is divided by a plane including a center point of the bottom plane portion 3 and a center point of the top plane portion 5, for example.

The side plane portion 4 has a plurality of insertion holes 4a, 4a, . . . formed thereon.

An installation groove 4b is formed on an inner surface of the side plane portion 4 at a position close to the top plane portion 5. The top plane portion 5 has installation holes 5a, 5a formed thereon separately, having a space therebetween in a horizontal direction.

One end of each of the sleeves 6, 6 formed cylindrical with a ceramic material or a metal material is attached to fit each of the installation holes 5a, 5a of the top plane portion 5.

A lens body 7 is arranged in the positioning space 2a of the housing 2. The lens body 7 comprises a sealing cap 8 formed cylindrical, a transmission side lens unit 9 provided inside of the sealing cap 8, a reception side lens unit 10 also provided inside the sealing cap 8 and a light shielding unit 11 provided between the transmission side lens unit 9 and the reception side lens unit 10, which are formed integrally.

On outer surface of the sealing cap 8, a portion to be installed 8a extending in a peripheral direction and projecting outwardly is provided.

As for the lens body 7, the sealing cap 8, the transmission side lens unit 9 and the reception side lens unit 10 are formed with a transparent resin material, and the light shielding unit 11 is formed with a resin material different from the one forming the sealing cap 8, the transmission side lens unit 9 and the reception side lens unit 10. The light shielding unit 11 is formed with a material having a lower refractive index than the material for the sealing cap 8 or the like. The lens body 7 is formed by means of a so-called insert molding, in which a material of the sealing cap 8 and the like is filled in a mold in a condition that the light shielding unit 11 is positioned in the mold.

Polyolefin materials including Zeonex (a product of Zeon Corporation) and Arton (product of JSR Corporation) are used for the transparent resin material for the sealing cap 8. Both the refractive indexes of Zeonex and Arton are 1.53.

Quartz (refractive index 1.45) is used for a material of the light shielding unit 11, for example. In addition, a fluoric polymer material such as Opstar (a product of JSR Corporation) can be used as a material of the light shielding unit 11. The refractive index of Opstar is 1.36 to 1.42.

The light shielding unit 11 of the lens body 7 has a function of reflecting a stray light and preventing the stray light from coming from the transmission side lens unit 9 into the reception side lens unit 10 when an optical signal outputted from a light emitting element to be described later becomes the stray light. The light shielding unit 11 only needs to have a function of reflecting at least a part of the optical signal inputted to the transmission side lens unit 9 and shielding it. However, it is desirable that the light shielding unit 11 has a function of total reflection, that is, reflecting all the stray lights.

In the following, conditions of the total reflection by the light shielding unit 11 will be explained (see FIG. 2).

Assuming that an incident angle of the stray light against the light shielding unit 11 is $\theta$; a refractive index of the light shielding unit 11 is N1; and a refractive index of the sealing cap 8 and the like is N2, the conditions for total reflection are defined as: $\sin \theta > N1/N2$ and $N2 \sin \theta > N1$. Since the incident angle is in a range of 0° to 90° and is defined as $0 \leq \sin \theta \leq 1$, it is desirable that N1 be as small as possible with regard to N2, taking a minimum value of $\sin \theta$ being 0 into consideration. Accordingly, it is desirable that the lens body 7 employs a material having a refractive index as small as possible compared to that of the material of the sealing cap 8 for the light shielding unit 11.

It is noted that if the refractive index of the light shielding unit 11 is smaller than that of the sealing cap 8 or the like, stray lights can be prevented. Therefore, using the fact that a refractive index of the atmosphere is small, as shown in FIG. 3, an air gap may be formed between the transmission side lens unit 9 and the reception side lens unit 10 and may be used as a light shielding unit 11A.

It may be also possible to employ an opaque body for the light shielding unit 11. It is preferable that a material having a higher melting point than that of the resin material making up of the sealing cap 8 and the like is used for the opaque body. If the light shielding unit 11 employs the opaque body, it is possible to prevent absolutely stray light from going into the reception side lens unit 10.

Furthermore, a wavelength absorbing material that absorbs a wavelength that the optical signal outputted from the light emitting element may be used as the light shielding unit 11. The wavelength of light used in the optical link device 1 is generally in a range of 650 nm to 780 nm; and it is desirable to have a material absorbing a wavelength in this range for the wavelength absorbing material.

As the wavelength absorbing material, a thin film formed with silicon dioxide and titanium dioxide (refractive index 1.45) may be used, for example. Even if the light shielding unit 11 is made of the wavelength absorbing material, it is also possible to prevent absolutely stray light from going into the reception side lens unit 10. In this case, the whole light shielding unit 11 may be made of a material absorbing wavelengths, and the light shielding unit 11 may be made by coating the material absorbing wavelengths on a surface of the metal material or the resin material.

It is noted that if the opaque body or the wavelength absorbing material is employed for the light shielding unit 11, it is possible to prevent the stray light inputted to the reception side lens unit 10 irrespective of the incident angle of the stray light into the light shielding unit 11.

In the above description, an example of forming the light shielding unit 11 with resin material has been described. However, the light shielding unit 11 may be formed with not only resin material but also various materials including a metal material and a ceramic material, for example.

As for the lens body 7, the portion to be installed 8a is fitted in the installation groove 4b of the housing 2 to be attached to the housing 2.

In the positioning space 2a of the housing 2, there is disposed an optical communication package 12 in addition to the lens body 7. The optical communication package 12 comprises an element mounting unit 13 formed with a resin material, a lead frame 14, part of which is attached on the element mounting unit 13, and a light emitting element 15 and a light receiving element 16 that are provided as a photoelectric conversion element.

The element mounting unit 13 comprises an element disposing portion 13a and a peripheral wall portion 13b standing from a fringe of the element disposing portion 13a. The lead frame 14 has external pins 14a, 14a . . . projected outwardly from the element mounting unit 13. The external lead pins 14a, 14a . . . are projected outwardly from the insertion holes 4a, 4a . . . of the housing 2, respectively, to be connected to each connection unit of an external device such as a personal computer.

The lens body 7 is fixed at the peripheral wall portion 13b of the element mounting unit 13 in a state that one end plane of the sealing cap 8 abuts on the peripheral wall portion 13b. Fixing the lens body 7 on the element mounting unit 13 seals the light emitting element 15 and the light receiving element 16 air-tightly. The light emitting element 15 and the light receiving element 16 air-tightly sealed with the lens body 7 prevents dew condensation due to environmental temperature changes and improves reliability in operation of the light emitting element 15 and the light receiving element 16.

In a condition that the lens body 7 is fixed to the optical communication package 12, the light emitting element 15 and the light receiving element 16 are positioned to face the transmission side lens unit 9 and the receiving side lens unit 10 of the lens body 7, respectively.

Optical fibers 17, 17 to be connected to the optical link device 1 are covered with ferrules 18, 18 at each tip portion. The optical fibers 17, 17 are inserted into the sleeves 6, 6 together with the ferrules 18, 18, and the tip planes thereof abut on the transmission side lens unit 9 and the reception side lens unit 10 of the lens body 7, respectively, to be positioned with regard to the optical link device 1 and to be jointed.

In this way, in a condition that the optical fibers 17, 17 are jointed to the optical link device 1, when an electrical signal is inputted from an external device to the light emitting element 15 through the external lead pin 14a, an optical signal is generated through photoelectric conversion by the light emitting element 15, and the optical signal (laser beam) is outputted from the light emitting element 15 to one of the optical fibers 17.

The optical signal outputted from the light emitting element 15 is inputted into the transmission side lens unit 9 of the lens body 7 and is converged by the transmission side lens unit 9 so as to be inputted to the one optical fiber 17 so that data is transmitted and received.

At this time, the optical signal outputted from the light emitting element 15 and inputted to the transmission side lens unit 9 sometimes reflects or is double-refracted in the lens body 7 to go toward the reception side lens unit 10 as a stray light. However, the light shielding unit 11 provided in the lens body 7 shields the stray light, and the stray light is prevented from coming into the reception side lens unit 10.

On the other hand, when the optical signal is transmitted to the other optical fiber 17, the transmitted optical signal is outputted from the optical fiber 17 toward the light receiving element 16.

The optical signal outputted from the other optical fiber 17 is inputted to the reception side lens unit 10 of the lens body 7 and inputted to the light receiving element 16 from the reception side lens unit 10. The optical signal inputted to the light receiving element 16 is photoelectrically converted in the light receiving element 16 so that an electrical signal is generated. The electrical signal is inputted to an external device through the external lead pin 14a so that the data is received.

As described above, in the optical link device 1, since the light shielding unit 11 is formed in the lens body 7 in which the sealing cap 8, the transmission side lens unit 9 and the reception side lens unit 10 are integrally formed, it is possible to prevent the optical signal that was outputted from the light emitting element 15 and inputted to the transmission side lens unit 9 from coming into the light receiving element 16 and to avoid deterioration of the signal inputted to the light receiving element 16.

In addition, since the light shielding unit 11 is formed integrally in the lens body 7, it is not necessary to dispose the transmission side lens unit 9 and the reception side lens unit 10 separately, so that it becomes possible to reduce the number of parts constituting the optical link device 1 and the size thereof.

Furthermore, it is also possible to reduce the manufacturing cost of the optical link device 1 by integrally forming the light shielding unit 11 together with the transmission side lens unit 9 and the reception side lens 10 unit.

Next, a second embodiment will be explained (see FIG. 4 to FIG. 6).

It is noted that an optical link device 1A of the second embodiment described below is different from the optical link device 1 of the first embodiment described above only in that it has no light shielding unit in the lens body and has a light shielding cover for covering a light emitting element. Accordingly, only portions different from the optical link device 1 will be described in detail and the other portions are numbered with the same reference numerals as those in the optical link device 1 and a precise description thereof will be omitted.

Figure 4:
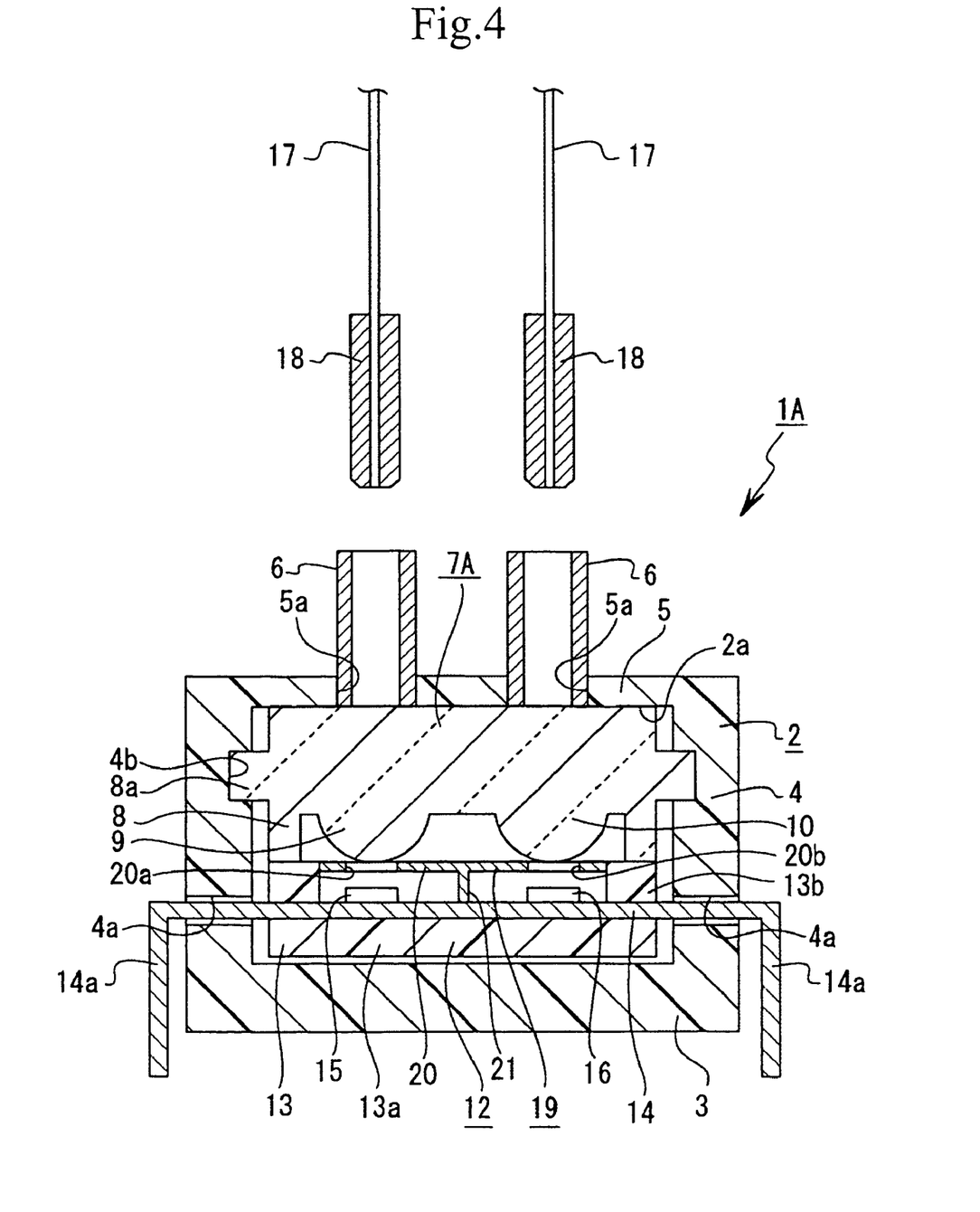
FIG. 4 shows an enlarged cross-sectional view of an optical link device and an optical fiber.

A lens body 7A of the optical link device 1A comprises a sealing cap 8, a transmission side lens unit 9 and a reception side lens unit 10 integrally formed with a transparent resin material, and it has no light shielding unit 11 as provided in the lens body 7 of the optical link device 1 (see FIG. 4). On an outer surface of the sealing cap 8, a portion to be installed 8a extending in a peripheral direction and projecting outwardly is provided.

As for the lens body 7A, the portion to be installed 8a is fitted in an installation groove 4b of a housing 2 so as to be attached to the housing 2.

Figure 5:
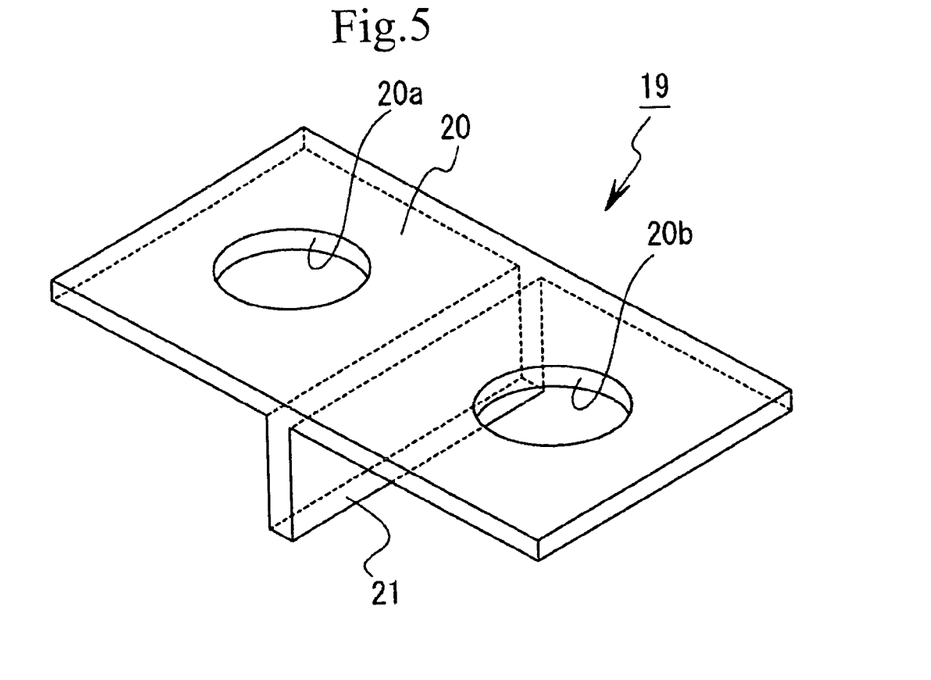
FIG. 5 is an enlarged perspective view of a light shielding cover.
Figure 6:
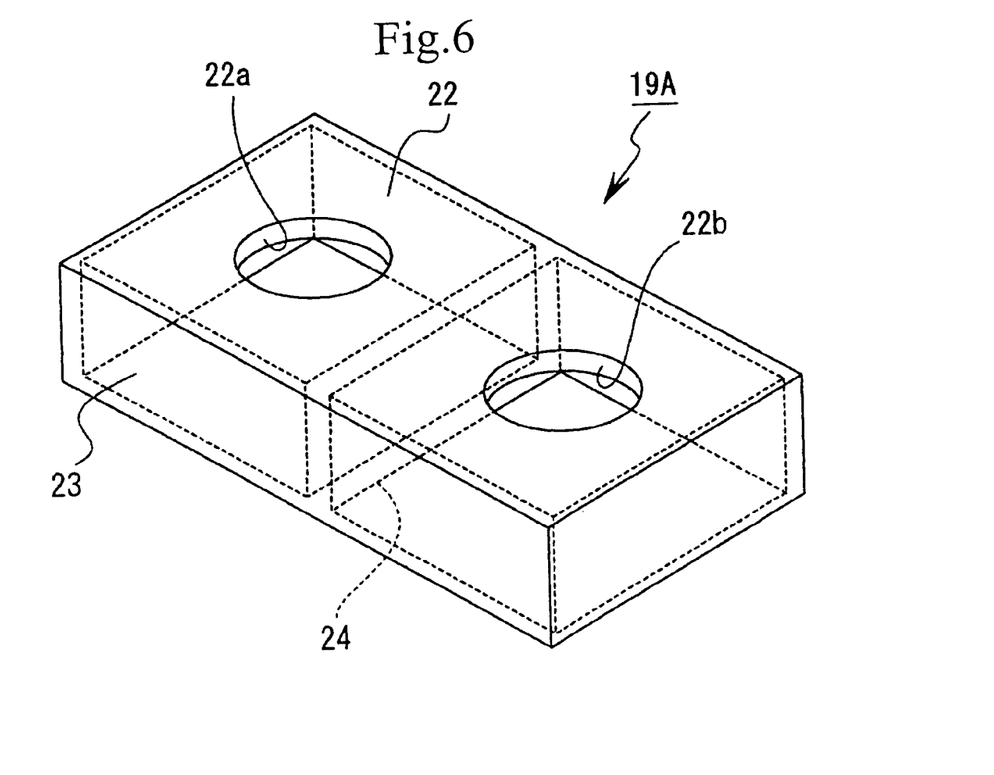
FIG. 6 is an enlarged perspective view showing a modified example of the light shielding cover.

An optical communication package 12 has a light shielding cover 19 covering a light emitting element 15 and a light receiving element 16 attached thereto (see FIG. 4 and FIG. 5). The light shielding cover 19 is made of a metal material, such as die-cast aluminum, and is grounded to a not-shown ground circuit formed in an element mounting unit 13 of the optical communication package 12.

The light shielding cover 19 comprises a covering portion 20 formed flatly and a partition portion 21 hanging down from a center portion in a horizontal direction of the covering portion 20. The covering portion 20 has transmission holes 20a and 20b respectively provided to oppose with each other, having the partition portion 21 therebetween.

In the light shielding cover 19, an outer shape of the covering portion 20 is formed to have a size and a shape identical to those of an opening of the element mounting unit 13 of the optical communication package 12, and the covering portion 20 is adhered to a rim of the opening of the element mounting unit 13. In a condition that the light shielding cover 19 is attached to the element mounting unit 13, the light emitting element 15 and the light receiving element 16 are partitioned with the partition portion 21, and the transmission holes 20a and 20b of the light shielding cover 19 are positioned in correspondence with the light emitting element 15 and the light receiving element 16, respectively.

In a condition that optical fibers 17, 17 are jointed to the optical link device 1A, when an electrical signal is inputted from an external device to the light emitting element 15 through an external lead pin 14a, an optical signal is generated through photoelectric conversion by the light emitting element 15 and the optical signal (laser beam) is outputted from the light emitting element 15 to one of the optical fibers 17.

The optical signal outputted from the light emitting element 15 is transmitted through the transmission hole 20a of the light shielding cover 19, inputted into the transmission side lens unit 9 of the lens body 7A, and converged by the transmission side lens unit 9 and inputted to one optical fiber 17 so that data is transmitted and received.

At this time, the optical signal outputted from the light emitting element 15 and inputted to the transmission side lens unit 9 sometimes reflects or is double-refracted in the lens body 7 to be a stray light. However, the light receiving element 16 is covered with the light shielding cover 19 so that the stray light is prevented from coming into the light receiving element 16.

In addition, when the optical signal is emitted from the light emitting element 15, an electromagnetic noise is sometimes generated. However, since the light shielding cover 19 formed with the metal material is grounded, the generated electromagnetic noise is hardly propagated to the light receiving element 16.

Furthermore, since the light emitting element 15 and the light receiving element 16 are partitioned with the partition portion 21, the generated electromagnetic noise is prevented from propagating to the light receiving element 16.

On the other hand, when the optical signal is transmitted to the other optical fiber 17, the transmitted optical signal is outputted from the optical fiber 17 toward the light receiving element 16.

The optical signal outputted from the other optical fiber 17 is inputted to the reception side lens unit 10 of the lens body 7A and is inputted from the reception side lens unit 10 to the light receiving element 16 through the transmission hole 20b. The optical signal inputted to the light receiving element 16 is photoelectrically converted to be an electrical signal. The electrical signal is inputted to an external device through the external lead pin 14a so that data reception is carried out.

As described above, in the optical link device 1A, since the light shielding cover 19 is disposed between the lens body 7 and the light emitting element 15 and light receiving element 16, it is possible to prevent the optical signal that was outputted from the light emitting element 15 and inputted to the transmission side lens unit 9 as stray light from coming into the light receiving element 16 and to avoid deterioration of the signal inputted to the light receiving element 16.

In addition, even if an electromagnetic noise is sometimes generated when the optical signal is emitted from the light emitting element 15, since the light shielding cover 19 formed with the metal material is grounded, it is possible to reduce adverse effects on the light receiving element 16 due to the generated electromagnetic noise.

Furthermore, since the light emitting element 15 and the light receiving element 16 are partitioned with the partition portion 21, it is possible to reduce adverse effects on the light receiving element 16 due to the generated electromagnetic noise.

In the following, a modified example of the light shielding cover will be explained (see FIG. 6).

The light shielding cover 19A of the modified example is made of a metal material and is grounded to a not-shown ground circuit formed in an element mounting unit 13 of an optical communication package 12.

The light shielding cover 19A comprises a covering portion 22 formed flatly, a peripheral wall portion 23 hanging down from a peripheral edge of the covering portion 22 and a partition portion 24 hanging down from a center portion in the horizontal direction of the covering portion 22. The covering portion 22 has transmission holes 22a and 22b provided to oppose with each other, having the partition portion 24 therebetween.

In the light shielding cover 19A, an outer shape of the covering portion 22 is formed to have a size and a shape identical to those of an opening of the element mounting unit 13 of the optical communication package 12, and in a condition that the peripheral wall portion 23 is disposed to fit inside the element mounting unit 13, the covering portion 22 is adhered to a rim of the opening of the element mounting unit 13, for example. In a condition that the light shielding cover 19A is attached to the element mounting unit 13, the light emitting element 15 and the light receiving element 16 are partitioned with the partition portion 24, and they are also surrounded by and covered with the peripheral wall portion 23. In the condition that the light shielding cover 19A is attached to the element mounting unit 13, the transmission holes 22a and 22b of the light shielding cover 19 are positioned in correspondence with the light emitting element 15 and the light receiving element 16, respectively.

In the case of using the light shielding cover 19A instead of the light shielding cover 19, it is possible to avoid adverse effects on the external device such as a personal computer because the generated electromagnetic noise is hardly propagated outwardly owing to the arrangement in which the light emitting element 15 and the light receiving element 16 are surrounded by and covered with the peripheral wall portion 23, in addition to the effect similar to those obtained with the light shielding cover 19.

Examples of the light shielding cover 19 and the light shielding cover 19A being formed with the metal material have been described in the above. However, the light shielding cover 19 and the light shielding cover 19A may be made of not only the metal material but also various materials including a resin material and a ceramic material. It is possible to prevent stray light from coming into the reception side lens unit 10 in this case.

Shapes and structures of respective portions described in each embodiment are only examples for substantiating the present invention in practical use, and, therefore, the scope of the present invention should not be interpreted limitedly with these examples.

As is apparent from the description above, the optical link device of the present invention is an optical link device to which a pair of optical fibers through which an optical signal is transmitted are connected to carry out data transmission and reception, and which is characterized by comprising: a light emitting element to which an electrical signal is inputted and which converts the electrical signal into an optical signal so as to output it to one of the optical fibers; a light receiving element to which an optical signal is inputted from the other of the optical fibers and which converts the optical signal into an electrical signal so as to output it; an element mounting unit on which the light emitting element and the light receiving element are mounted; and a lens body having a transmission side lens unit for guiding the optical signal outputted from the light emitting element to the one optical fiber and a reception side lens unit for guiding the optical signal outputted from the other optical fiber to the light receiving element, in which the transmission side lens unit and the reception side lens unit are integrally formed, and the device is characterized in that a light shielding unit formed integrally with the lens body, which is made of a material different from the transmission side lens unit and the reception side lens unit, is provided between the transmission side lens unit and the reception side lens unit thereof.

Therefore, it is possible to prevent the optical signal outputted from the light emitting element and inputted to the transmission side lens as a stray light from coming into the reception side lens unit and to avoid deterioration of the signal to be inputted to the light receiving element.

In addition, since the light shielding unit is formed integrally in the lens body, it is not necessary to dispose the transmission side lens unit and the reception side lens unit separately, so that it becomes possible to reduce the number of parts constituting the optical link device and the size thereof.

In addition, it is also possible to reduce the manufacturing cost of the optical link device by integrally forming the light shielding unit together with the transmission side lens unit and the reception side lens unit.

In the present invention, the material for forming the light shield is a material having a refractive index lower than that of a material for forming the transmission side lens unit and the reception side lens unit, so that the material can be selected from a wide selection range and the amount of the optical signal changed to stray light coming into the reception side lens unit can be reduced absolutely.

In the present invention, the opaque body is used for the light shielding unit so that the stray light is prevented absolutely from going into the reception side lens unit.

In the present invention, the wavelength absorbing material which absorbs the wavelength that the optical signal outputted from the light emitting element has is used for the light shielding unit so that the stray light is prevented absolutely from coming through from the transmission side lens unit to the reception side lens unit.

Another optical link device of the present invention is an optical link device to which a pair of optical fibers through which an optical signal is transmitted are connected to carry out data transmission and reception, and which is characterized by comprising: a light emitting element to which an electrical signal is inputted and which converts the electrical signal into an optical signal so as to output it to one of optical fibers; a light receiving element to which an optical signal is inputted from the other optical fiber and which converts the optical signal into an electrical signal so as to output it; an element mounting unit on which the light emitting element and the light receiving element are mounted; and a lens body having a transmission side lens unit for guiding the optical signal outputted from the light emitting element to the one optical fiber and a reception side lens unit for guiding the optical signal outputted from the other optical fiber to the light receiving element, in which the transmission side lens unit and the reception side lens unit are integrally formed, and the device is characterized in that it has a light shielding cover having a pair of transmission holes through which the optical signal outputted from the light emitting element or the optical signal to be inputted to the light receiving element is transmitted, which is disposed between the lens body and the light emitting element and light receiving element.

Therefore, it is possible to prevent the optical signal outputted from the light emitting element and inputted to the transmission side lens unit as a stray light from coming into the light receiving element and to avoid deterioration of the signal to be inputted to the light receiving element.

In the present invention, since the light shielding cover is formed with the metal material and the light shielding cover is grounded, even if the electromagnetic noise is generated when the optical signal is emitted from the light emitting element, the generated electromagnetic noise is hardly propagated to the light receiving noise, and it is possible to reduce adverse effects on the light receiving element due to the electromagnetic noise.

In the present invention, since the light shielding cover is provided with the partition portion between the light emitting element and the light receiving element, even if the electromagnetic noise is generated when the optical signal is emitted from the light emitting element, the generated electromagnetic noise is prevented from propagating to the light receiving noise, and it is possible to avoid adverse effects on the light receiving element due to the electromagnetic noise.

The invention claimed is:

1. An optical link device to which a pair of optical fibers through which an optical signal is transmitted are connected to carry out data transmission and reception, characterized by comprising:

a light emitting element to which an electrical signal is inputted and which converts the electrical signal into an optical signal so as to output to one of the optical fibers;

a light receiving element to which an optical signal is inputted from the other of the optical fibers and which converts the optical signal into an electrical signal so as to output it;

an element mounting unit on which the light emitting element and the light receiving element are mounted; and a lens body having a transmission side lens unit for guiding the optical signal outputted from the light emitting element to the one optical fiber and a reception side lens unit for guiding the optical signal outputted from the other optical fiber to the light receiving element, in which the transmission side lens unit and the reception side lens unit are integrally formed, and characterized in that:

a light shielding unit formed integrally within and encased by the lens body, which is made of a material different from the transmission side lens unit and the reception side lens unit is provided between the transmission side lens unit and the reception side lens unit thereof.

2. The optical link device as claimed in claim 1, characterized in that a material whose refractive index is lower than that of a material forming the transmission side lens unit and the reception side lens unit is used for forming said light shielding unit.

3. The optical link device as claimed in claim 1, characterized in that an opaque body is used for said light shielding unit.

4. The optical link device as claimed in claim 1, characterized in that a wavelength absorbing material for absorbing a wavelength that the optical signal outputted from the light emitting element has is used for said light shielding unit.

5. The optical link device as claimed in claim 1, wherein the material of the light shielding unit comprises quartz.

6. The optical link device as claimed in claim 1, wherein the material of the light shielding unit comprises a fluoric polymer material.

7. The optical link device as claimed in claim 1, wherein the material of the light shielding unit comprises a metal material.

8. The optical link device as claimed in claim 1, wherein the material of the light shielding unit comprises a ceramic material.

* * * * *

UNITED STATES PATENT AND TRADEMARK OFFICE
CERTIFICATE OF CORRECTION

PATENT NO. : 7,121,744 B2 Page 1 of 1
APPLICATION NO. : 10/483250
DATED : October 17, 2006
INVENTOR(S) : Kiyoshi Yamauchi et al.

It is certified that error appears in the above-identified patent and that said Letters Patent is hereby corrected as shown below:

Column 12:
Line 9, "has is" should read -- is --.

Signed and Sealed this

Twelfth Day of June, 2007

JON W. DUDAS
*Director of the United States Patent and Trademark Office*